United States Patent [19]

Kim

[11] Patent Number: 5,896,466
[45] Date of Patent: Apr. 20, 1999

[54] METHOD AND APPARATUS FOR ENCODING A CONTOUR OF AN OBJECT BY USING A VERTEX INSERTING TECHNIQUE

[75] Inventor: Jin-Hun Kim, Seoul, Rep. of Korea

[73] Assignee: Daewoo Electronics Co., Ltd., Seoul, Rep. of Korea

[21] Appl. No.: 08/868,817

[22] Filed: Jun. 4, 1997

[30] Foreign Application Priority Data

Jan. 20, 1997 [KR] Rep. of Korea ............... 97-1481

[51] Int. Cl.[6] ............................................ G06K 9/36
[52] U.S. Cl. ............................................ 382/242
[58] Field of Search .................... 382/180, 197, 382/199, 203, 232, 235, 236, 238, 239, 240, 242, 243; 348/384, 394, 395, 400–404, 407–416, 420–421, 425, 430–431, 699

[56] References Cited

U.S. PATENT DOCUMENTS

| | | |
|---|---|---|
| 5,635,986 | 6/1997 | Kim ........................ 382/242 |
| 5,691,769 | 11/1997 | Kim ........................ 382/242 |
| 5,737,449 | 4/1998 | Lee ......................... 382/242 |
| 5,754,703 | 5/1998 | Kim ........................ 382/242 |
| 5,757,971 | 5/1998 | Kim ........................ 382/242 |
| 5,764,808 | 6/1998 | O'Connell et al. ....... 382/242 |
| 5,828,790 | 10/1998 | Kim ........................ 382/242 |
| 5,838,829 | 11/1998 | Kim ........................ 382/242 |

*Primary Examiner*—Jose L. Couso
*Attorney, Agent, or Firm*—Pennie & Edmonds LLP

[57] ABSTRACT

A method for encoding a video signal of a contour of an object based on an iterated refinement technique determines a plurality of primary vertices on the contour; and calculates a displacement for each contour segment to produce displacements on all pairs of two adjacent primary vertices. After determining a dynamic range as a criterion for encoding pixel data on the contour based on the displacements, the method searches a larger contour segment which is a contour segment whose number of bits required to encode pixel data thereon is larger than that of the dynamic range, and inserts one or more secondary vertices on the larger contour segment based on the dynamic range.

16 Claims, 6 Drawing Sheets

5,896,466

METHOD AND APPARATUS FOR ENCODING A CONTOUR OF AN OBJECT BY USING A VERTEX INSERTING TECHNIQUE

FIELD OF THE INVENTION

The present invention relates to a method and apparatus for encoding a contour of an object in a video signal; and, more particularly, to a method and apparatus capable of encoding the contour through the use of an adaptive coding scheme based on an octant based vertex coding technique and a vertex inserting technique.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

In processing a contour of an object expressed in a video signal, contour information representing positions of contour pixels constituting the contour is important for the analysis and synthesis of the shape of the object. A classical coding method used to represent the contour information is a chain coding technique. The chain coding technique, however, requires a substantial amount of bits for representing the contour information, although the technique does ont incur any loss in the contour information.

To overcome the drawback of the chain coding method, therefore, there have been proposed several methods to encode the contour information such as a polygonal approximation, B-spline approximation and DST (Discrete Sine Transform) combined with a polygonal approximation technique. In such approximation techniques, the contour is approximated by line or curve segments, each of the segments connecting a pair of neighboring vertices on the contour, and the vertices are encoded based on, e.g., the so-called locally-adaptive octant-based vertex coding technique (see, e.g., International Organisation for Standardisation, Coding of Moving Pictures and Audio Information, ISO/IEC JTC1/SC29/WG11, Shape Coding AHG, Jul. 30, 1996, entitled "Revised Description of S4a: Geometrical Representation Method" by K. O'Connell, P. Gerken and J. H. Kim).

Referring to FIG. 1, there is shown a schematic block diagram of a conventional apparatus for encoding vertices of a contour of an object in a video signal based on the octant-based vertex coding technique.

A binary mask is inputted to a contour extraction block 10, wherein in the binary mask, each of the pixels is represented by one of the binary values, i.e., 0 or 1, depending on whether a pixel resides either in an object or in a background region.

The contour extraction block 10 extracts a contour image of the object from the binary mask and provides the contour image to a vertex selection block 20. The contour is made of contour pixels, each being an object pixel positioned on the boundary of the object.

The vertex selection block 20 selects a plurality of vertices by using a conventional iterated refinement technique, e.g., a polygonal approximation technique, wherein a pair of contour pixels separated by a maximum distance is determined first as starting vertices and additional contour pixels are selected, one by one, as another vertex until a largest perpendicular distance $d_{max}$ from a line segment joining a pair of adjacent vertices to a contour segment defined by the pair of adjacent vertices does not exceed a preset threshold $D_{max}$.

At a vertex coding block 30, the vertices received from the vertex selection block 20 are encoded based on, e.g., the so-called octant-based vertex coding technique.

In the octant-based vertex coding technique, an x and a y components, denoted as X and Y, of a displacement R between every pair of adjacent vertices are calculated. Thereafter, two vertices corresponding to a largest magnitude among all the x and the y components (X's and Y's) are selected as an initial vertex and an ending vertex of the contour. N vertices are then sequentially indexed along the contour starting from the initial vertex toward the ending vertex as shown in FIG. 2, N being a total number of vertices on the contour and assumed to be 8 in FIG. 2 for purposes of illustration. In FIG. 2, the x component corresponding to the pair of vertices $V_1$ and $V_8$ is shown to be the largest among the 8 pairs of X's and Y's obtained from the vertices $V_1$ to $V_8$.

After determining the initial and the ending vertices, an x_max and a y_max, the respective maximum values among the x and the y components ($X_i$'s and $Y_i$'s) of the displacements $R_i$'s, are determined as an x_dynamic_range and a y_dynamic_range of the contour, respectively, wherein $R_i = P_{i+1} - P_i$ for i=1, 2, ..., N-1, $P_i$, being a position vector corresponding to a vertex $V_i$. Subsequently, the total number of vertices N, the x_dynamic_range, the y_dynamic_range and the absolute position of the initial vertex $V_1$ are encoded, while each of the remaining vertices, i.e., $V_{i+1}$ for i=1 to (N-1), is encoded based on the displacement $R_i$ from its previous vertex $V_i$. Specifically, as shown in FIG. 3, an octant to which a vertex $V_{i+1}$ belongs is determined among octant 0 to octant 7 based on an x component $X_i$ and a y component $Y_i$ of the displacement $R_i$, wherein the eight nearest neighbors to the origin (all marked by the closed circles in FIG. 3) represent the starting points of the eight octants.

After determining octants for the vertices $V_{i+1}$'s, the indices of the octants are coded by using the conventional differential chain coding technique; and the magnitudes of the components $x_i$ and $Y_i$, i.e., x_mag and y_mag, representing the relative position of the vertex $V_{i+1}$ with respect to its preceding vertex $V_i$ are encoded using the bits determined based on the x_dynamic_range and the y_dynamic_range, respectively.

In another instance of the octant-based vertex coding technique, the octant indices and $R_i$'s are encoded alternatively through the use of the so-called syntax-adaptive arithmetic coding (SAAC). In the SAAC, the number of possible symbols depends on the dynamic range maximum, i.e., max(x_dynamic_range, y_dynamic_range). For further details of the octant-based vertex coding technique, see K. O'Connell et al., supra.

By virtue of the process of ordering the vertices as described above, the amount of data representing the vertices can be effectively reduced in the octant-based vertex coding technique, since each of the vertices except the initial one is represented by the octant it belongs to and the magnitudes of $X_i$ and $Y_i$ and the number of bits needed to encode the magnitudes depends directly on the x_dynamic_range and the y_dynamic_range.

However, such conventional contour coding method may still require a large amount of bits in representing the vertices, especially in the case where the x and the y components ($X_i$'s and $Y_i$'s) for almost all of adjacent vertices are considerably smaller than the x_dynamic_range and the y_dynamic_range.

SUMMARY OF THE INVENTION

It is, therefore, an object of the invention to provide an improved contour encoding method and apparatus which can be beneficially used to further reduce the amount of transmission data and, therefore, increase a vertex coding efficiency, wherein one or more secondary vertices is properly added to a plurality of primary vertices determined by a conventional polygonal approximation technique so that the x_dynamic_range and the y_dynamic_range may be reduced.

In accordance with the invention, there is provided a method for encoding a video signal of a contour of an object based on an iterated refinement technique, wherein a plurality of primary vertices are determined on the contour having contour pixels therein and each contour segment defined by two adjacent primary vertices is approximated by a line segment joining the two adjacent primary vertices, the method comprising the steps of:

(a) calculating a displacement for said each line segment to produce displacements for all pairs of two adjacent primary vertices;

(b) determining a dynamic range for the contour based on the displacements, wherein the dynamic range is determined based on a predetermined criterion to encode pixel data on the contour;

(c) searching a larger contour segment based on the dynamic range, wherein the larger contour segment is a contour segment whose number of bits required to encode pixel data thereon is larger than that of the dynamic range;

(d) inserting one or more secondary vertices on the larger contour segment based on the dynamic range; and (e) encoding pixel data on the primary and the secondary vertices based on the dynamic range.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
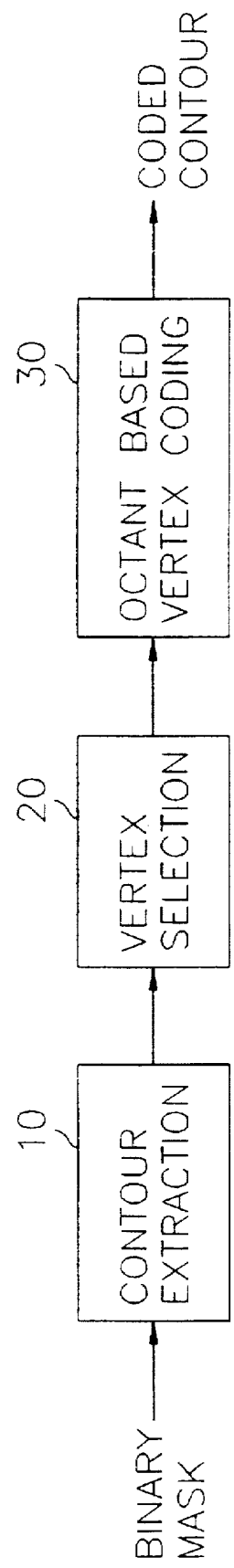
FIG. 1 shows a schematic block diagram of a conventional apparatus for encoding vertices of a contour of an object in a video signal based on the octant-based vertex coding technique.
Figure 2:
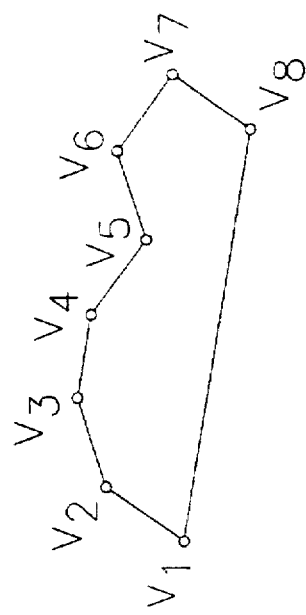
FIG. 2 presents an exemplary contour for illustrating initial vertex selection process of a conventional apparatus for encoding vertices of a contour.
Figure 3:
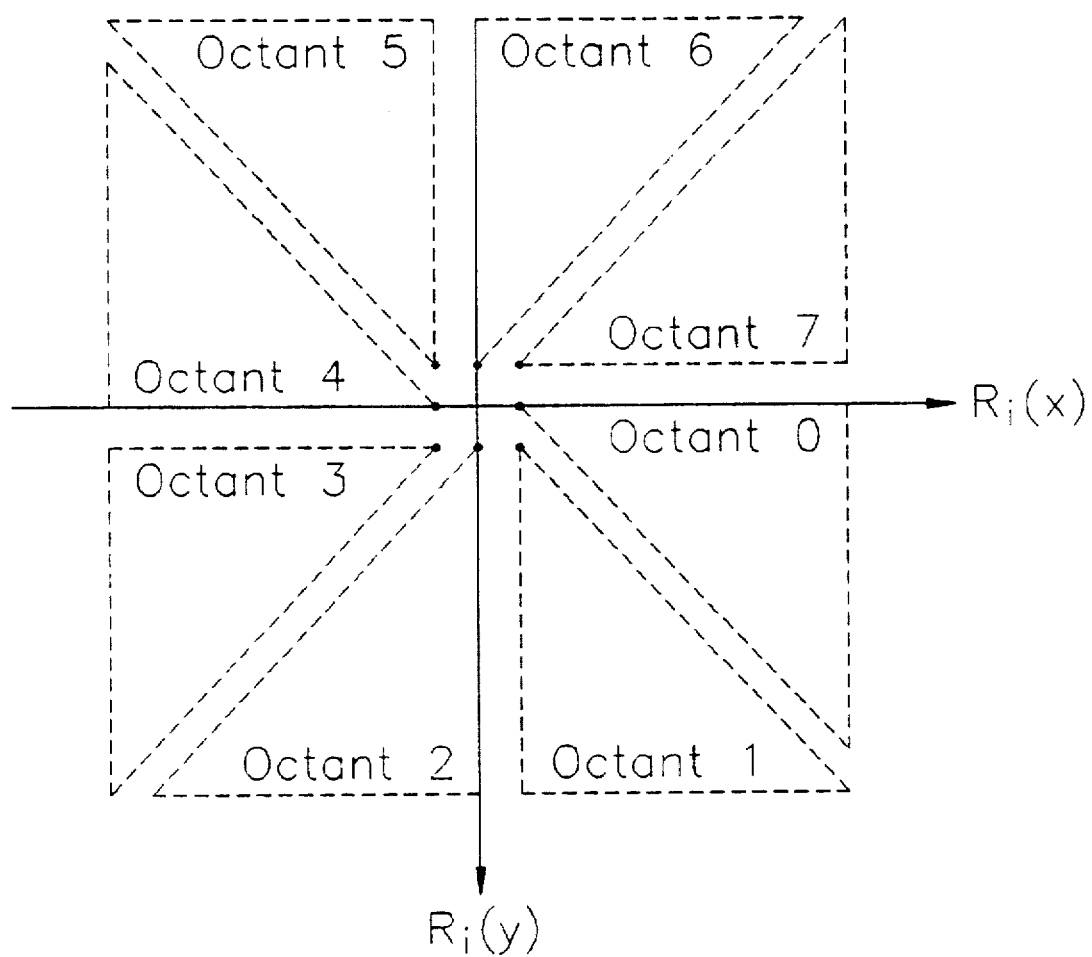
FIG. 3 describes an explanatory diagram for illustrating the relative address octant areas.
Figure 4:
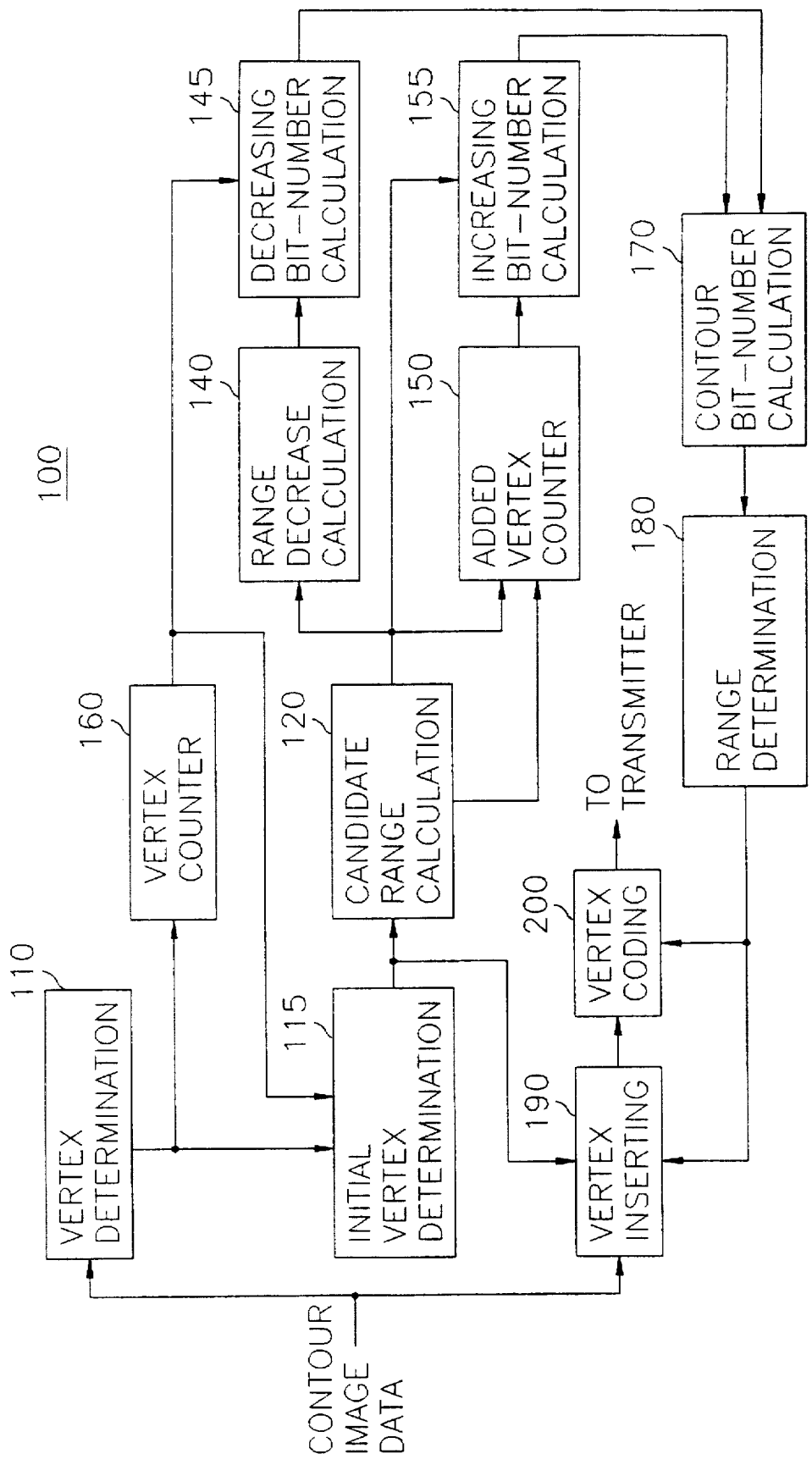
FIG. 4 represents a block diagram of an apparatus for encoding input contour image data in accordance with the present invention.

Referring to FIG. 4, there is shown a block diagram of an apparatus 100 for encoding contour image data in accordance with the present invention, wherein the contour image data represents positions of contour pixels constituting a contour of an object. The contour image data is fed to a vertex determination block 110 and a vertex inserting block 190.

The vertex determination block 110 determines a plurality of primary vertices on the contour by using a conventional iterated refinement technique, e.g., a polygonal approximation technique. The primary vertices are arranged in a processing order along the contour and information on the arranged primary vertices is provided one after another to an initial vertex determination block 115 and a vertex counter 160.

First of all, the vertex counter 160 counts the number N of the reordered primary vertices and provides the primary vertex number N to the initial vertex determination block 115 and a decreasing bit-number calculation block 145.

In the meantime, the initial vertex selection block 115 selects an initial and an ending vertices by use of a conventional vertex reordering technique. In the conventional vertex reordering technique, horizontal and vertical components, X and Y of a displacement R between every pair of adjacent primary vertices are calculated; and two primary vertices among the N primary vertices corresponding to the largest magnitude among X's and Y's are selected as the initial and the ending vertices of the contour, respectively.

The other primary vertices are then sequentially indexed along the contour starting from the initial vertex toward the ending vertex. Information of the positions of the reordered primary vertices based on the initial and the ending vertices is provided to a candidate range calculation block 120 and the vertex inserting block 190.

The candidate range calculation block 120 calculates x and y components $X_i$'s and $Y_i$'s of the displacements $R_i$'s, wherein $R_i = P_{i+1} - P_i$ for $i=1, 2, \ldots, N-1$; and $P_1$, $P_i$ and $P_N$ are position vectors of the initial, i-th and ending vertices, $V_1$, $V_i$ and $V_N$, respectively. It is preferable to take no account of the displacement $P_1-P_N$ between the initial and the ending vertices, $V_1$ and $V_N$, because the displacement $P_1-P_N$ need not to be encoded in order to reduce the bit number. Any $X_i$ and $Y_j$ for i, j=1, 2, . . . , N-1 can be determined as an x_dynamic_range and a y_dynamic_range of the contour, respectively, as described hereinafter in accordance with the present invention so that $X_i$ and $Y_j$, respectively, may be referred as x and y candidate ranges of the contour. In other words, x and y candidate ranges, $X_i$ and $Y_j$, in a candidate range $C_{ij}=(X_i, Y_j)$ is independent from each other. $X_i$ and $Y_j$ for i, j=1, 2, . . . , N-1 are converted into x_bit$_i$ and y_bit$_j$, the respective smallest bit numbers required to encode $X_i$ and $Y_j$, respectively; and $X_i$ and $Y_j$ with their respective x__bit$_i$ and y__bit$_j$ for i, j=1, 2, ..., N−1 are sequentially provided to a range decrease calculation block 140, an added vertex counter 150 and an increasing bit-number calculation block 155.

In another preferred embodiment, $X_i$'s and $Y_j$'s may be sorted in order of magnitudes, respectively, so that the sorted candidate ranges can be sequentially provided to the next block; or a duplication number for each of $X_i$'s and $Y_j$'s may be considered for fast calculation, wherein the duplication number for said each of $X_i$'s and $Y_j$'s represents the number of $X_i$'s or $Y_j$'s having the same magnitude.

The range decrease calculation block 140 calculates a bit difference for each candidate range $C_{ij}=(X_i, Y_j)$ based on a maximum range M=(x__max, y__max), wherein the x__max and the y__max represent the respective maximum values of $X_i$'s and $Y_j$'s of all the displacements $R_i$'s or $R_j$'s for i, j=1,2, ..., N−1; and the bit difference for said each candidate range $C_{ij}$ represents a difference between the sum of x__bit$_{max}$ and y__bit$_{max}$ for the maximum range M and the sum of x__bit$_i$ and y__bit$_j$ for said each candidate range $C_{ij}=(X_i, Y_j)$. For example, if the x__max and the y__max are assigned with 6 and 5 bits for encoding, respectively, a bit difference for a candidate range $C_{ij}$ whose x__bit$_i$ and y__bit$_j$ are 3 and 4, respectively, is 4(=(6−3)+(5−4)) bits. Bit differences for their respective candidate ranges $C_{ij}$'s are provided to the decreasing bit-number calculation block 145.

The decreasing bit-number calculation block 145 calculates a decreasing bit-number for each candidate range $C_{ij}$, wherein the decreasing bit-number represents a bit number decrease generated due to the bit difference between the maximum range and the candidate range if all the primary vertices are encoded by using said each candidate range $C_{ij}$, not the maximum range M. The decreasing bit-numbers for each candidate range $C_{ij}$ is calculated by multiplying the bit difference with the vertex number from the vertex counter 160. Decreasing bit-numbers for the respective candidate ranges $C_{ij}$'s are sequentially provided to a contour bit-number calculation block 170.

If a candidate range $C_{ij}=(X_i, Y_j)$ is different from the maximum range M, there must be one or more than one larger contour segment $L_{ij}$, wherein each larger contour segment $L_{ij}$ for the candidate range $C_{ij}$ represents a contour segment with a displacement having either its x component X being larger than $X_i$ or y component Y being larger than $Y_j$, and, therefore, one or more secondary vertices must be added on each larger contour segments $L_{ij}$ in order that all vertices including the secondary vertices may be coded by the candidate range $C_{ij}$. The added vertex counter 150, therefore, calculates how many secondary vertices must be added on larger contour segments $L_{ij}$'s. Total secondary vertex numbers $N_{ij}$'s of all the larger contour segments $L_{ij}$'s for the candidate ranges $C_{ij}$'s are provided to the increasing bit-number calculation block 155.

Figure 5A:
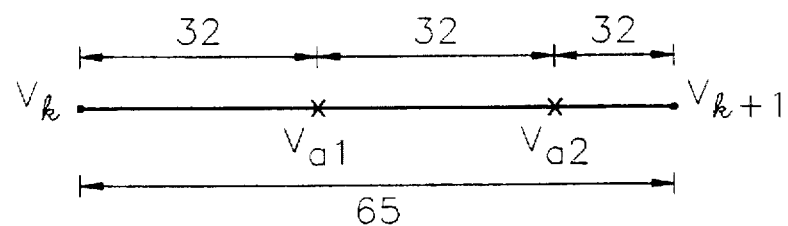
FIGS. 5A and 5B provide two different line contours to be encoded with 7 bits.
Figure 5B:
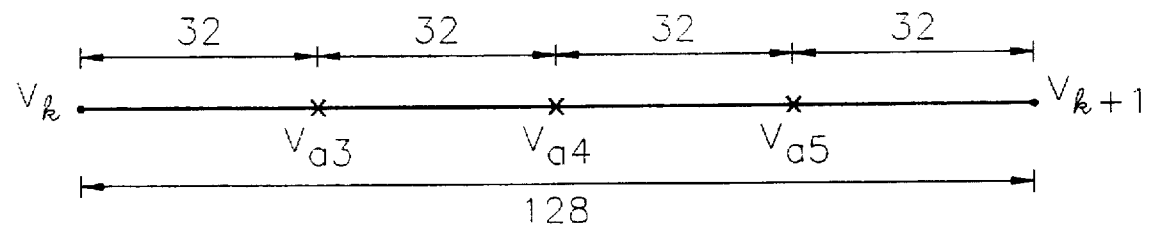

5 and 7 bits are required to represent a magnitude 17 to 32 and another magnitude 65 to 128, respectively, and, therefore, 2 and 3 secondary vertices must be added on lines with magnitudes of 65 and 128, respectively, as shown in FIGS. 5A and 5B, so that the magnitude of 7 bits can be encoded on a 5 bit basis.

Figure 6:
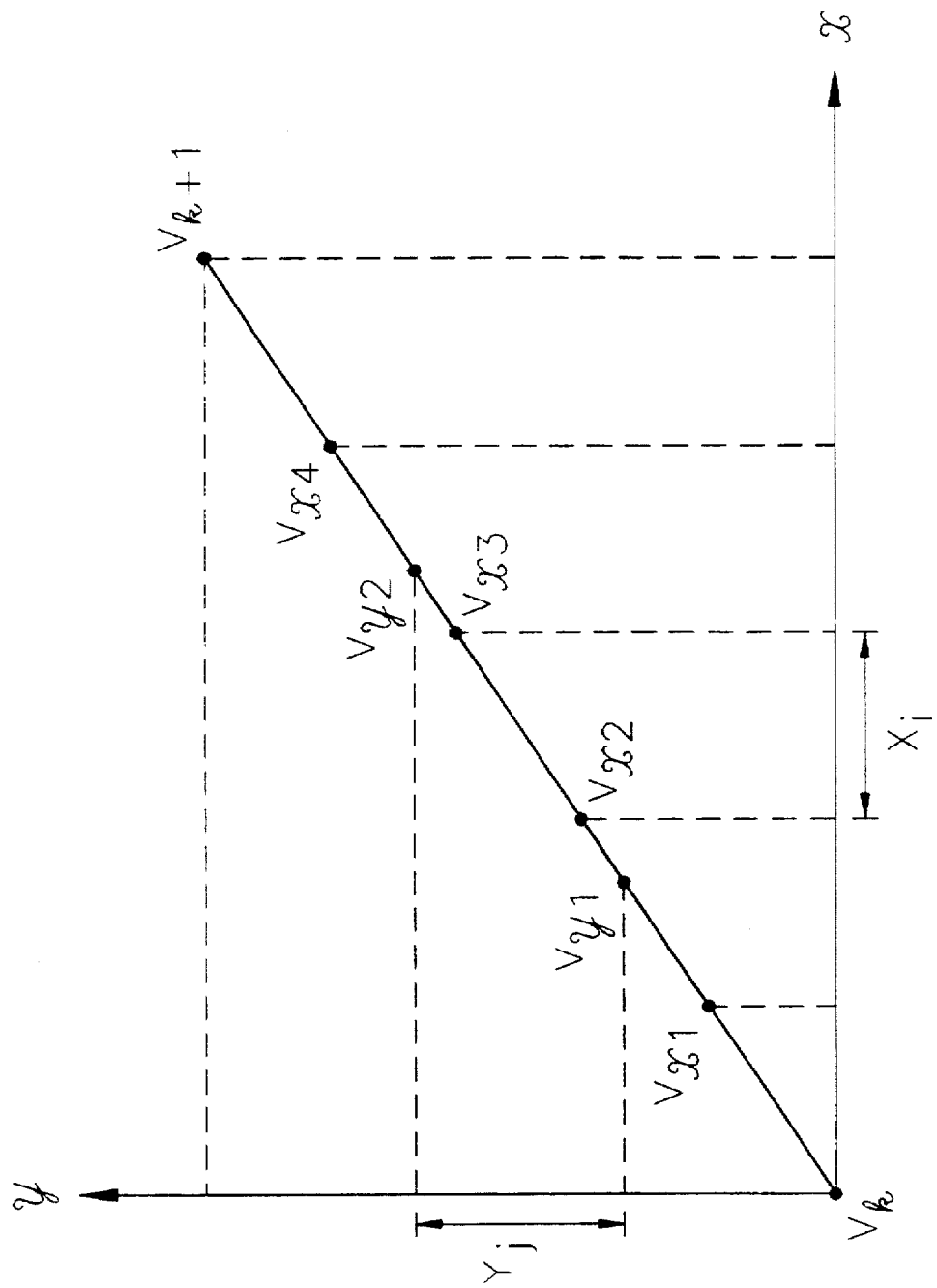
FIG. 6 depicts a line contour that is inserted with different numbers of secondary vertices on the line contour along x and y directions, respectively.

While, if 4 secondary vertices $V_{x1}$ to $V_{x4}$ are required along the x direction based on $X_i$ but 2 secondary vertices $V_{y1}$ and $V_{y2}$ are needed along the y direction based on $Y_j$, it is reasonable that a larger number of secondary vertices 4, not a smaller number of secondary vertices 2, should be added between two adjacent primary vertices $V_k$ and $V_{k+1}$ as shown in FIG. 6.

Figure 7:
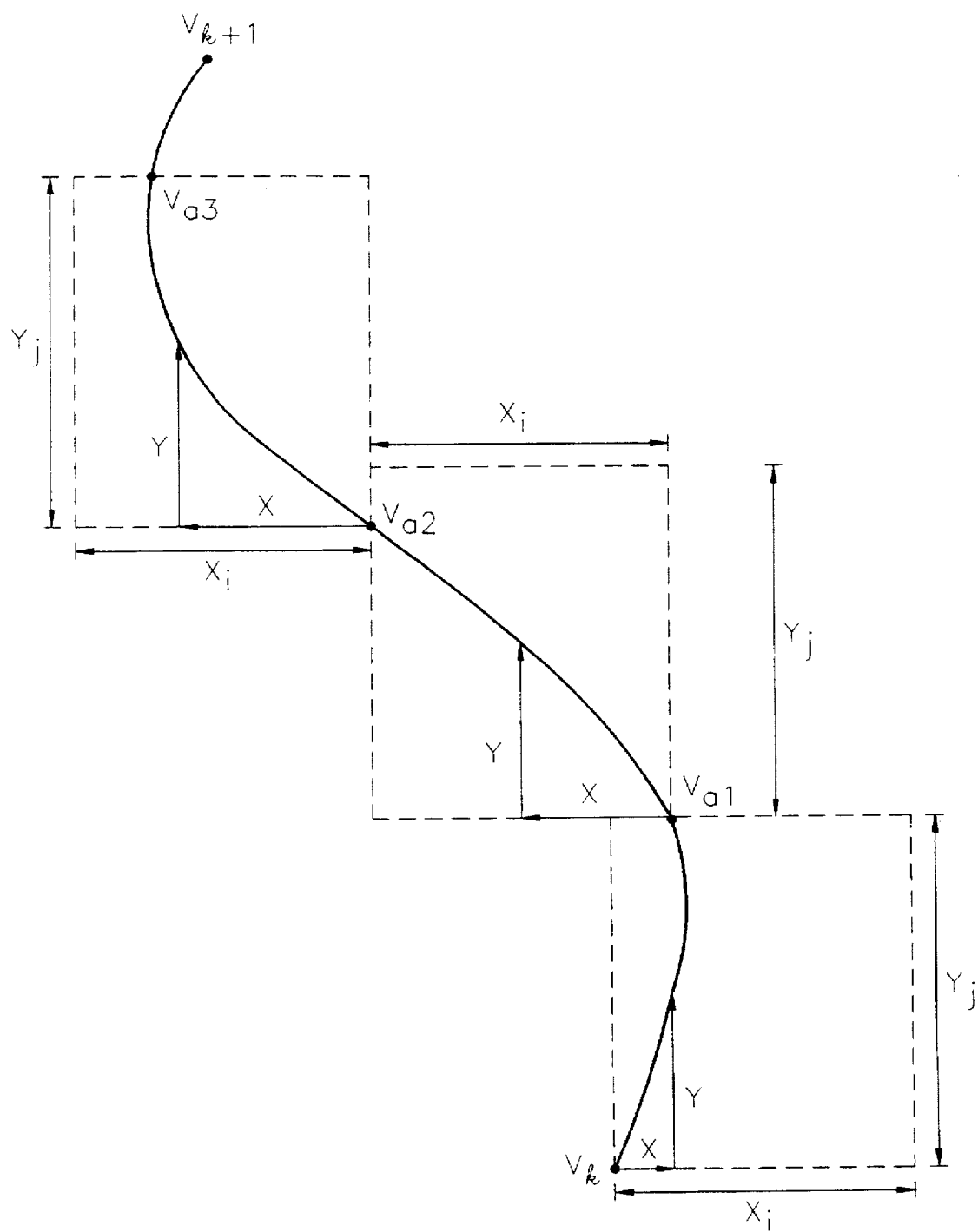
FIG. 7 illustrates an secondary vertex inserting process by using a contour tracing technique.

In another embodiment, it is preferable to consider the shape of each larger contour segment itself by using a contour tracing technique in order to add the secondary vertices at proper positions. Referring to FIG. 7, there is illustrated a larger contour segment formed by two adjacent primary vertices $V_k$ and $V_{k+1}$. In accordance with the present invention, 3 secondary vertices $V_{a1}$ to $V_{a3}$ are inserted on the larger contour segment based on a candidate range $C_{ij}=(X_i, Y_j)$ drawn by a dash line in FIG. 7. Specifically, on tracing the larger contour segment from a kth primary vertex $V_k$ toward a (k+1)th primary vertex $V_{k+1}$, x and y components, X and Y, of displacement from the kth vertex $V_k$ to any contour pixel on the larger contour segment are calculated; X and Y are compared with $X_i$ and $Y_j$, respectively; and a contour pixel, whose X is equal to $X_i$ or whose Y is equal to $Y_j$, is determined as a secondary vertex $v_{a1}$. Sequentially, through repeating the above contour tracing based on the secondary vertex $V_{a1}$, another contour pixel is determined as another secondary vertex $V_{a2}$, and so on.

Referring back to FIG. 4, the increasing bit-number calculation block 155 calculates an increasing bit-number for each candidate range $C_{ij}$ based on the total secondary vertex number $N_{ij}$ fed from the added vertex counter 150, wherein the increasing bit-number represents a bit number increase due to the secondary vertices inserted on each larger contour segments $L_{ij}$ for said each candidate range $C_{ij}$. The increasing bit-number for each candidate range $C_{ij}$ is calculated by multiplying the secondary vertex number $N_{ij}$ with a sum of x__bit$_i$ and y__bit$_j$ for the candidate range $C_{ij}=(X_i, Y_j)$. Increasing bit-numbers for the respective candidate ranges $C_{ij}$'s are sequentially provided to the contour bit-number calculation block 170.

The contour bit-number calculation block 170 generates a contour bit-number $B_{ij}$ for each candidate range $C_{ij}$ by subtracting the corresponding increasing bit-number from the corresponding decreasing bit-number and provides information on contour bit-numbers $B_{ij}$'s to a range determination block 180.

The range determination block 180 determines a candidate range having a maximum among all the contour bit-numbers $B_{ij}$'s as a dynamic range D=($X_d$, $Y_d$) for vertex-coding and provides information on the dynamic range D to the vertex inserting block 190 and a vertex coding block 200.

The vertex inserting block 190 inserts secondary vertices on the contour based on the dynamic range D=($X_d$, $Y_d$) fed from the range determination block 180. According to the information on the positions of the reordered primary vertices fed from the initial vertex determination block 115, one or more secondary vertices are inserted on each larger contour segment, wherein said each larger contour segment represents a contour segment with a displacement having either its x component X being larger than $X_d$ of the dynamic range or its y component Y being larger than $Y_d$, respectively. It is preferable that the detailed vertex inserting procedure is the same as the above-stated contour tracing technique as shown FIG. 7, except substituting $X_i$ and $Y_j$ of each candidate range $C_{ij}$ with $X_d$ and $Y_d$ of the dynamic range D. The vertex inserting block 190 provides information on the total is vertices, i.e., the primary and the secondary vertices, to the vertex coding block 200 in the processing order.

The vertex coding block 200 encodes the total vertices fed from the vertex inserting block 190 based on the dynamic range D fed from the range determination block 180 to generate vertex coded data; and transmits the vertex coded data to the transmitter(not drawn).

While the present invention has been described with respect to the particular embodiments, it will be apparent to those skilled in the art that various changes and modifications may be made without departing from the spirit and scope of the invention as defined in the following claims.

What is claimed is:

1. A method for encoding a video signal of a contour of an object based on an iterated refinement technique, wherein a plurality of primary vertices are determined on the contour having contour pixels therein and each contour segment defined by two adjacent primary vertices is approximated by a line segment joining the two adjacent primary vertices, the method comprising the steps of:

(a) calculating a displacement for said each contour segment to produce displacements for all pairs of two adjacent primary vertices;

(b) determining a dynamic range for the contour based on the displacements, wherein the dynamic range is determined based on a predetermined criterion to encode pixel data on the contour;

(c) searching a larger contour segment based on the dynamic range, wherein the larger contour segment is a contour segment whose number of bits required to encode pixel data thereon is larger than that of the dynamic range;

(d) inserting one or more secondary vertices on the larger contour segment based on the dynamic range; and (e) encoding pixel data on the primary and the secondary vertices based on the dynamic range.

2. The method according to claim 1, wherein the dynamic range is determined by considering the total number of bits required to encode the pixel data on the contour.

3. The method according to claim 2, wherein said determining step (a) includes the steps of:

(a1) counting a number N of the primary vertices, N being a positive integer;

(a2) selecting any two adjacent primary vertices among all the N primary vertices as an initial and an ending vertices, respectively, and indexing the remaining primary vertices along the contour from the initial vertex toward the ending vertex; and (a3) calculating a displacement $R_i$ for each pair of adjacent primary vertices $V_i$ and $V_{i+1}$ to generate x and y components $X_i$ and $Y_i$ for each displacement $R_i$, wherein $R_i = P_{i+1} - P_i$, $P_i$ being a position vector of an ith vertex $V_i$ for i=1, 2, ..., N−1.

4. The method according to claim 3, wherein the predetermined criterion at said determining step (b) includes the steps of:

(b1) estimating contour bit-numbers $B_{ij}$'s for the x component $X_i$ of $R_i$ and the y component $Y_j$ of $R_j$ for i,j =1, 2, ... N−1, wherein each contour bit-number $B_{ij}$ represents the number of bits necessary to encode contour information on the contour based on the $X_i$ and the $Y_j$; and (b2) comparing all contour bit-numbers $B_{ij}$'s with each other to select $X_i$ and $Y_j$ corresponding to a smallest among all contour bit-numbers $B_{ij}$'s as x_dynamic_range and y_dynamic_range, respectively, wherein the x_dynamic_range and the y_dynamic_range constitute the dynamic range.

5. The method according to claim 4, wherein said selecting step (a2) has the steps of:

(a21) calculating x and y components X and Y of a displacement for each pair of adjacent primary vertices to generate the x and the y components X's and Y's;

(a20) comparing all the x and the y components X's and Y's with each other to select a largest magnitude among all the x and the y components X's and Y's;

(a23) selecting two adjacent primary vertices corresponding to the largest magnitude as the initial and the ending vertices, respectively.

6. The method according to claim 4, wherein said estimating step (b1) has the steps of:

(b11) converting all the x and the y components $X_i$'s and $Y_j$'s to x_$bit_i$'s and y_$bit_j$'s, wherein the x_$bit_i$ and the y_$bit_j$ are the numbers of bits required to encode the $X_i$ and the $Y_j$, respectively;

(b12) obtaining x_max and y_max which are respective maximum values of x and y components $X_i$'s and $Y_j$'s for i, j=1, 2, ..., N to generate x_$bit_{max}$ and y_$bit_{max}$, wherein the x_$bit_{max}$ and the y_$bit_{max}$ represent the numbers of bits required to encode the x_max and the y_max;

(b13) computing a decreasing bit-number for each candidate range $C_{ij}=(X_i, Y_j)$ based on the primary vertex number N, the x and the y components $X_i$'s and $Y_j$'s and the x_max and the y_max, wherein the decreasing bit-number represents a decrease in a bit number in a coding based on said each candidate range $C_{ij}=(X_i, Y_j)$, not the x_max and y_max;

(b14) estimating an increasing bit-number for said each candidate range $C_{ij}$ based on all the displacements, wherein the increasing bit-number represents an increase in a bit number in a coding based on said each candidate range $C_{ij}=(X_i, Y_j)$ not the x_max and y_max; and (b15) generating the contour bit-number $B_{ij}$ for said each candidate range $C_{ij}$ for i, j=1, 2, ..., N−1, wherein the contour bit number $B_{ij}$ represents a subtraction of the increasing bit-number from the decreasing bit-number for said each candidate range $C_{ij}$.

7. The method according to claim 6, wherein the decreasing bit-number for said each candidate range $C_{ij}$ represents the primary vertex number N multiplied by the difference between the sum of the x_$bit_{max}$ and y_$bit_{max}$ and the sum of the x_$bit_i$ and y_$bit_j$.

8. The method according to claim 6, wherein said estimating step (b14) contains the steps of:

(b141) calculating an secondary vertex number $N_{ij}$ to be added on larger contour segments for the candidate range $C_{ij}$, wherein the number of bits required to encode pixel data on each larger contour segment is larger than that of the dynamic range, and the secondary vertex number $N_{ij}$ represents a total number of secondary vertices which are added to all the larger contour segments in order that the pixel data on the contour may be encoded based on the candidate range $C_{ij}$; and (b142) calculating the increasing bit-number for each candidate range $C_{ij}$, wherein the increasing bit-number is obtained by multiplying the secondary vertex number $N_{ij}$ with a sum of x_$bit_i$ and y_$bit_j$ for the candidate range $C_{ij}$ ($X_i$, $Y_j$).

9. An apparatus for encoding a video signal of a contour of an object based on an iterated refinement technique, wherein a plurality of primary vertices are determined on the contour having contour pixels therein and each contour segment defined by two adjacent primary vertices is approximated by a line segment joining the two adjacent primary vertices, the apparatus comprises:

means for calculating a displacement for said each contour segment to produce displacements for all pairs of two adjacent primary vertices;

means for determining a dynamic range for the contour based on the displacements, wherein the dynamic range is obtained based on a predetermined criterion to encode pixel data on the contour;

means for searching a larger contour segment based on the dynamic range, wherein the larger contour segment is a contour segment whose number of bits required to encode pixel data thereon is larger than that of the dynamic range;

means for inserting one or more secondary vertices on the larger contour segment based on the dynamic range; and means for encoding pixel data on the primary and the secondary vertices based on the dynamic range.

10. The apparatus according to claim 9, wherein the dynamic range is determined by considering the total number of bits required to encode the pixel data on the contour.

11. The apparatus according to claim 10, wherein said calculating means includes:

counter for counting a number N of the primary vertices, N being a positive integer;

initial vertex determination means for selecting any two adjacent primary vertices among all the N primary vertices as an initial and an ending vertices, respectively, and indexing the remaining primary vertices along the contour from the initial vertex toward the ending vertex; and means for calculating a displacement $R_i$ for each pair of adjacent primary vertices $V_i$ and $V_{i+1}$ to generate x and y components $X_i$ and $Y_i$ for each displacement $R_i$, wherein $R_i = P_{i+1} - P_i$, $P_i$ being a position vector of an ith vertex $V_i$ for i=1, 2, ..., N-1.

12. The apparatus according to claim 11, wherein said determining means includes:

means for estimating contour bit-numbers $B_{ij}$'s for the x component $X_i$ of $R_i$ and the y component $Y_j$ of $R_j$ for i, j=1, 2, ..., N-1, wherein each contour bit-number $B_{ij}$ represents the number of bits necessary to encode contour information on the contour based on the $X_i$ and the $Y_j$; and means for comparing all contour bit-numbers $B_{ij}$ with each other to select $X_i$ and $Y_j$ corresponding to a smallest among all contour bit-numbers $B_{ij}$'s as x_dynamic_range and y_dynamic_range, respectively, wherein the x_dynamic_range and the y_dynamic_range constitute the dynamic range.

13. The apparatus according to claim 12, wherein said initial vertex determination means has:

means for calculating x and y components X and Y of a displacement for each pair of adjacent primary vertices to generate the x and the y components X's and Y's;

means for comparing all the x and the y components X's and Y's with each other to select a largest magnitude among all the x and the y components X's and Y's; and means for selecting two adjacent primary vertices corresponding to the largest magnitude as the initial and the ending vertices, respectively.

14. The apparatus according to claim 12, wherein said estimating means has:

means for converting all the x and the y components $X_i$'s and $Y_j$'s to x_bit$_i$'s and y_bit$_j$'s, wherein the x_bit$_i$ and the y_bit$_j$ are the number of bits required to encode the $X_i$ and the $Y_j$, respectively;

means for obtaining x_max and y_max which are the respective maximum values of x and y components $X_i$'s and $Y_j$'s for i, j=1, 2, ..., N to generate x_bit$_{max}$ and y_bit$_{max}$, wherein the x_bit$_{max}$ and the y_bit$_{max}$ represent the number of bits required to encode the x_max and the y_max;

means for computing a decreasing bit-number for each candidate range $C_{ij}=(X_i, Y_j)$ based on the primary vertex number N, the x and the y components $X_i$'s and $Y_j$'s and the x_max and the y_max, wherein the decreasing bit-number represents an decrease in a bit number in a coding based on said each candidate range $C_{ij}=(X_i, Y_j)$, not the x_max and y_max;

means for estimating an increasing bit-number for said each candidate range $C_{ij}$ based on all the displacements, wherein the increasing bit-number represents an increase in a bit number in a coding based on said each candidate range $C_{ij}=(X_i, Y_j)$, not the x_max and y_max; and means for generating the contour bit-number $B_{ij}$ for said each candidate range $C_{ij}$ for i, j=1, 2, ..., N-1, wherein the contour bit number $B_{ij}$ represents the subtraction of the increasing bit-number from the decreasing bit-number for said each candidate range $C_{ij}$.

15. The apparatus according to claim 14, wherein the decreasing bit-number for said each candidate range $C_{ij}$ is obtained by multiplying the primary vertex number N with a difference between a sum of the x_bit$_{max}$ and y_bit$_{max}$ and a sum of the x_bit$_i$ and y_bit$_j$.

16. The apparatus according to claim 14, wherein said increasing bit-number estimating means contains:

means for calculating an secondary vertex number $N_{ij}$ to be added on larger contour segments for the candidate range $C_{ij}$, wherein the number of bits required to encode pixel data on each larger contour segment is larger than that of the dynamic range, and the secondary vertex number $N_{ij}$ represents a total number of secondary vertices which are added to all the larger contour segments in order that the pixel data on the contour may be encoded based on the candidate range $C_{ij}$; and means for calculating the increasing bit-number for each candidate range $C_{ij}$, wherein the increasing bit-number is obtained by multiplying the secondary vertex number $N_{ij}$ with a sum of x_bit$_i$ and y_bit$_j$ for the candidate range $C_{ij}=(X_i, Y_j)$.

\* \* \* \* \*